Patented July 2, 1929.

1,719,657

UNITED STATES PATENT OFFICE.

HENRYK GOLDMANN, OF WILHELMSBURG-ON-THE-ELBE, GERMANY.

METHOD OF TREATING ANTIMONIAL ORES.

No Drawing. Application filed February 11, 1927, Serial No. 167,603, and in Germany March 29, 1926.

This application is a continuation in part of my co-pending application Serial No. 125,592, filed July 26, 1926.

While the application 125,592 describes a dry reduction method for antimoniferous ores, especially antimoniferous tin ores, the present development of the invention relates to a wet reduction process.

As is well known, great difficulties are experienced in eliminating antimony from antimonial ores, such as tin-ores and the like, especially if the ores must be roasted prior to extraction, since in the roasting process the antimonial compounds are converted into tetraoxide of antimony $Sb_2O_4$, which is almost insoluble in acids. Hence in case of roasting antimoniferous tin-ores as hitherto done, and subsequently leaching the roasted ores with the aid of any suitable acid or acids, it will be found that the major portion of antimony originally contained in the ore is present in the residue containing the tin.

The object of this invention is to provide a method of treating antimoniferous ores especially tin-ores in a manner that the antimony will be separated from the ores and the residual mineral substances will be practically free from antimony.

With this object in view I subject the ore or ores to a leaching operation by means of a suitable acid or acids, to which reducing substances such as metallic protoxide salts for instance cuprous or ferrous salts are added. By treating the ores in this way almost all of the antimony will be dissolved and the remaining residue will only contain traces of antimony.

In case of carrying out the invention in this way and employing for the purpose, by way of example, a solution of ferrous sulphate or an acid solution of ferrous chloride for leaching the crushed ore, not only almost all of the antimony, but also copper, bismuth, and arsenic and the major portion of lead contained in the ore will be dissolved almost completely and the resulting residue will be practically free from such metals. The present invention can be used with every kind of antimoniferous ores, independently of the percentage of antimony. The acid, which may be used advantageously, is concentrated hydrochloric acid of 20° Bé. The leaching temperature is conveniently kept at 110° C. The percentage of the copper or iron-salt is used in proportion to the amount of antimony in the ore and is about 10–15% of the acid.

A chief advantage gained thereby resides in the fact that tin-ores treated in the manner described will be immediately adapted for the subsequent treatment in the reverberatory furnace without requiring any intermediate treatment for the purpose of removing copper, bismuth, arsenic, lead and iron which apparently is an important advance as regards both the technical and the commercial point of view. Hitherto the removal of the said metals required a time-consuming and expensive chlorinating roasting operation which is entirely dispensed with according to my improved method.

What I claim is:—

1. The process of treating antimonial ores to dissolve the antimony and obtain a residue substantially free of antimony which comprises leaching the ore with a non-oxidizing inorganic acid containing a metallic protoxide salt having the property of reducing antimony oxide.

2. The process of treating antimonial ores to dissolve the antimony and obtain a residue substantially free of antimony which comprises leaching the ore with hydrochloric acid containing a metallic protoxide salt having the property of reducing antimony oxide.

3. The process of treating antimonial ores to dissolve the antimony and obtain a residue substantially free of antimony which comprises leaching the ore with a non-oxidizing inorganic acid containing a ferrous salt having the property of reducing antimony oxide.

4. The process of treating antimonial ores to dissolve the antimony and obtain a residue substantially free of antimony which comprises leaching the ore with hydrochloric acid containing a ferrous salt having the property of reducing antimony oxide.

5. The process of treating antimonial ores to dissolve the antimony and obtain a residue substantially free of antimony which comprises leaching the ore with hydrochloric acid containing ferrous sulphate.

In testimony whereof I affix my signature.

HENRYK GOLDMANN.